United States Patent

[11] 3,587,333

[72] Inventor Richard D. Duncan
 Richland, Wash.
[21] Appl. No. 1,675
[22] Filed Jan. 9, 1970
[45] Patented June 28, 1971
[73] Assignee The United States of America as represented by the United States Atomic Energy Commission

[54] GLOVE BOX TURNTABLE CAM ROTATING MECHANISM
4 Claims, 6 Drawing Figs.
[52] U.S. Cl. .................................................. 74/88
[51] Int. Cl. ............................................... F16h 27/02
[50] Field of Search .......................................... 74/88, 129, 128, 126, 813 (R), 814; 176/(Inquired)

[56] References Cited
UNITED STATES PATENTS
1,244,385 10/1917 Spehar ......................... 74/88X
3,154,147 10/1964 Lanmon II .................... 74/88X Primary Examiner—Milton Kaufman
Attorney—Roland A. Anderson ABSTRACT: A mechanism for rotating a glove box turntable through a predetermined angle includes a guide tube having upper and lower portions each with a plurality of linear grooves therein. The linear grooves in the lower portion are offset from the linear grooves in the upper portion. Each of the upper and lower portions of the guide tube have a plurality of wedge grooves intersecting the linear grooves in both the upper and lower portions. A shaft, positioned within the guide tube, is connected to the glove box turntable and includes a pin inserted in one of the linear grooves in the lower portion. Moving the shaft along the guide tube causes the pin to move along the linear groove in the lower portion to engage a wedge groove in the upper portion of the guide tube. The wedge groove moves the pin which causes the shaft to rotate through part of the predetermined angle to a linear groove in the upper portion of the guide tube. Moving the shaft in the reverse direction causes the pin to engage a wedge groove in the lower portion which moves the pin so as to rotate the shaft through the remainder of the predetermined angle back to a linear groove in the lower portion.

Inventor
Richard D. Duncan
Attorney

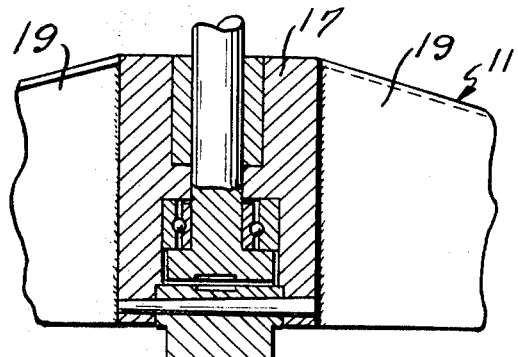
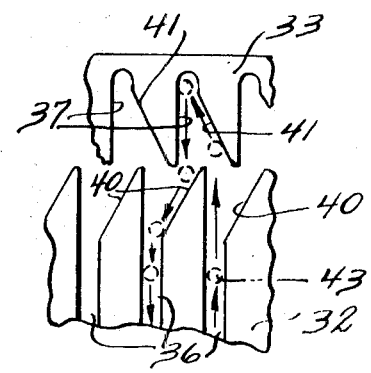
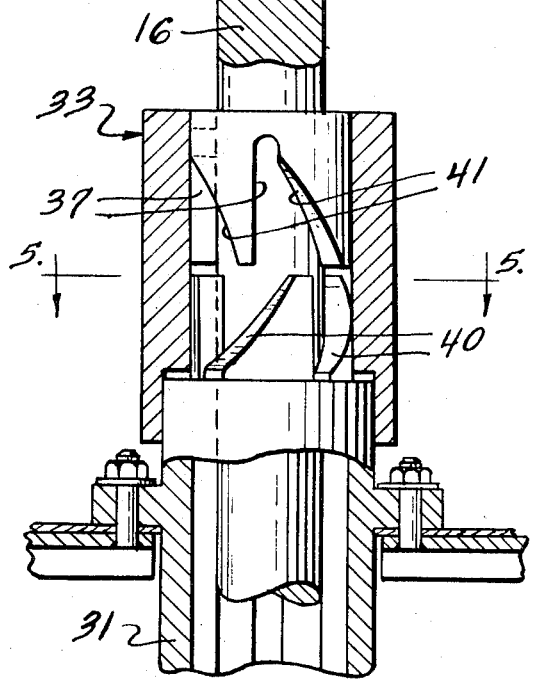
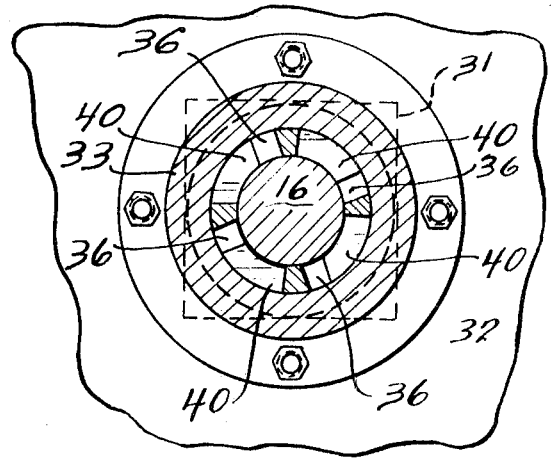
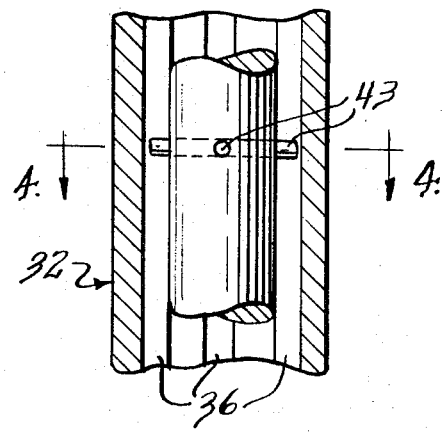
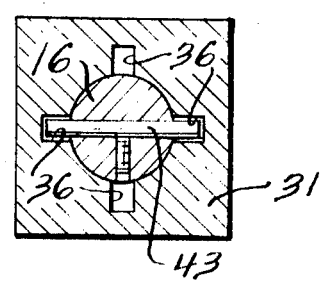
Inventor
Richard D. Duncan
Attorney

GLOVE BOX TURNTABLE CAM ROTATING MECHANISM

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

In order to prevent contamination of material and/or the environment, experiments and manufacturing processes are often carried out in a sealed enclosure. One form of enclosure commonly used is called a glove box, since access to the enclosure can be obtained through flexible gastight gloves into which the hands are inserted. In order to facilitate work in a glove box, automatic material transfer equipment is sometimes used. In particular, it may be desirable to change material from one station to another by rotating a turntable upon which the material is placed. Such a turntable must be indexed in various desired positions and may be required to be moved up and down. For example, in the process of heat-treating material, it is necessary to lower the material into heating and cooling stations after rotating and indexing the turntable.

It is therefore an object of this invention to provide an improved turntable rotating mechanism for a glove box.

Another object of this invention is to provide a turntable rotating mechanism for a glove box which automatically rotates and indexes the turntable as it is raised and lowered.

SUMMARY OF THE INVENTION

In practicing this invention, a glove box turntable mechanism is provided including a shaft connected to the glove box turntable. The shaft is inserted within a guide tube which has upper and lower interior portions positioned along a common longitudinal axis. Each of the upper and lower interior portions includes linear grooves extending along the walls of the guide tube substantially parallel to the longitudinal axis with the linear grooves in the upper portion being offset from the linear grooves in the lower portion. Wedge grooves within the upper portion of the guide tube intersect the linear grooves in both the upper and lower portions. Another set of wedge grooves positioned within the lower portion of the guide tube intersects both the lower and upper linear grooves. A pin inserted through the shaft is positioned in one or more of the linear grooves in the lower portion. Movement of the shaft along the longitudinal axis causes the guide pin to move from the lower portion to the upper portion of the guide tube and back to the lower portion. The movement of the guide pin from the lower portion to the upper portion of the guide tube causes the pin to engage the wedge grooves in the upper portion to rotate the pin and shaft through a portion of the predetermined angle and to position the pin in one of the upper linear grooves. The movement of the pin from the upper portion back to the lower portion of the guide tube causes the pin to engage the wedge grooves in the lower portion to rotate the pin and shaft through the remainder of the predetermined angle and to position the pin in a different one of the linear grooves in the lower portion of the guide tube.

BRIEF DESCRIPTION OF THE DRAWINGS

The invention is illustrated in the drawings, of which:

FIG. 3 is an enlarged cross-sectional view of the linear and wedge grooves of the turntable rotating mechanism;

FIG. 4 is a cross-sectional view showing the positioning of a guide pin in the linear grooves;

FIG. 5 is a cross-sectional view showing the wedge guide grooves; and

FIG. 6 is a view of the linear and wedge grooves unfolded to show the cam action which causes rotation of the turntable.

DETAILED DESCRIPTION OF THE INVENTION

Figure 1:
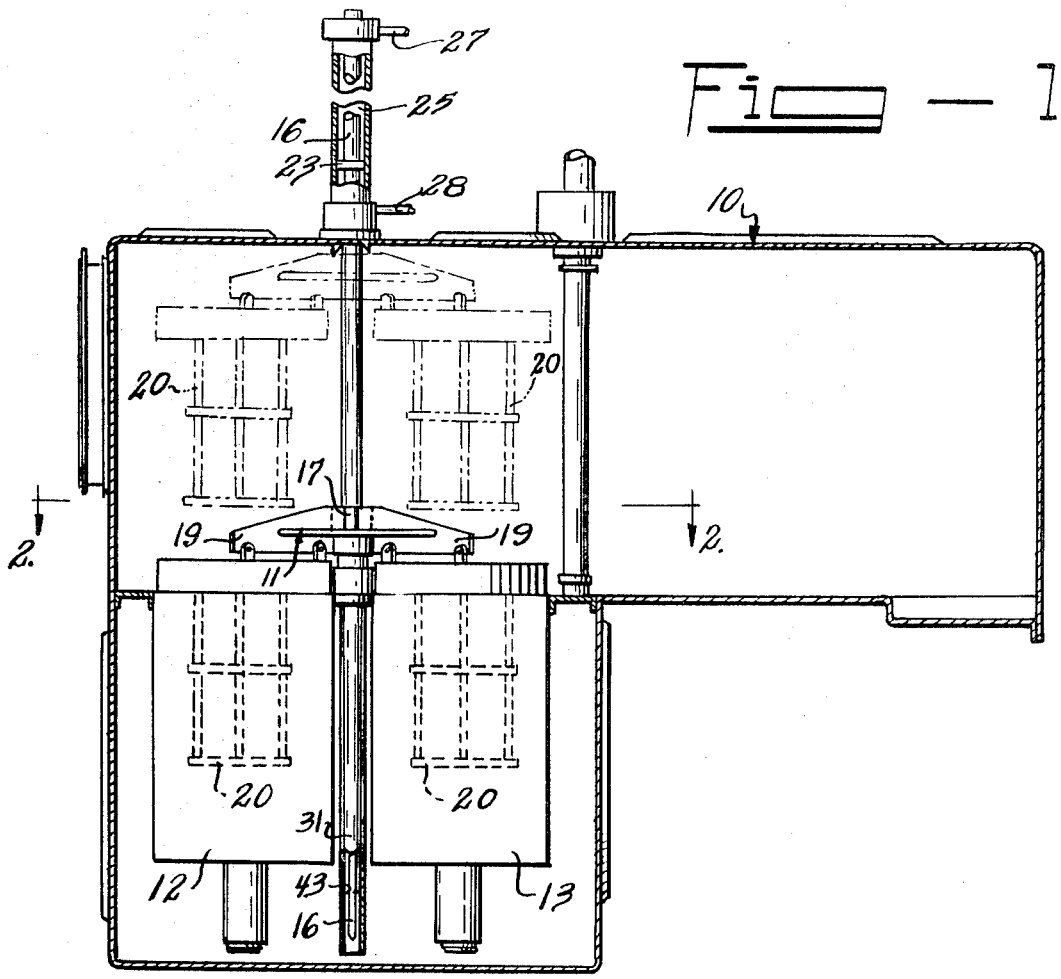
FIG. 1 is a cross-sectional side view of the glove box turntable and the turning mechanism.
Figure 2:
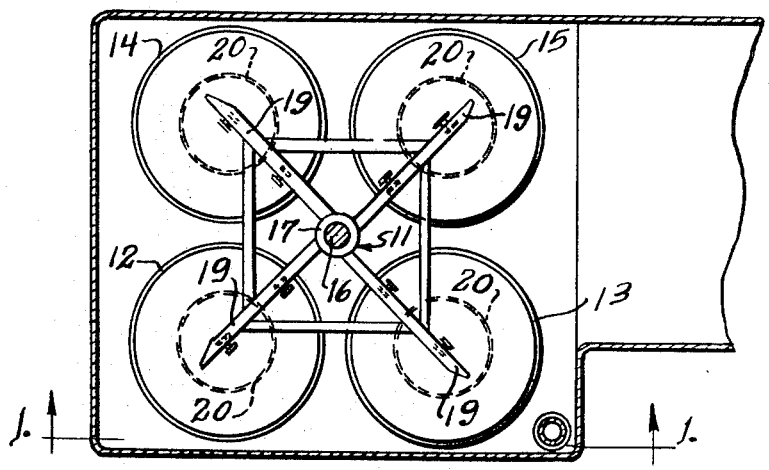
FIG. 2 is a top view of the glove box turntable.

In FIGS. 1 and 2, there is shown a glove box 10 with a turntable 11 and a turntable turning mechanism. The glove box 10 is used for heat-treating material and includes four heat-treating stations 12 to 15. Turntable 11 is connected to a shaft 16 and includes a bracket 17 having four arms 19. Each arm 19 supports a material basket 20. Material is inserted in one of the baskets 20 and during processing is transferred sequentially to the heat-treating stations 12 to 15 as required. While this example shows a series of heat-treating stations, the turntable rotating mechanism may be used for any form of material transfer required.

In order to raise and lower the turntable, a hydraulically operated piston 23 in a cylinder 25 is used. The piston is connected to shaft 16 which extends down into the glove box. Hydraulic fluid is pumped into and out of cylinder 25 through hydraulic lines 27 and 28 to move piston 23 and shaft 16 up and down as required. The movement of shaft 16 up and down acts to rotate turntable 11 in a manner to be described.

Referring to FIGS. 3, 4 and 5, there is shown a more detailed view of the cam mechanism which is used to rotate shaft 16 and turntable 11. The lower part of shaft 16 is inserted within a guide tube 31 which has an interior lower portion 32 and an interior upper portion 33. The lower portion 32 contains a plurality of linear grooves 36 extending along the lower portion 32 substantially parallel to the longitudinal axis of the guide tube 31. The upper portion 33 also has a plurality of linear grooves 37 extending along the upper portion 33 substantially parallel to the longitudinal axis of the guide tube 31. The linear grooves 36 and 37 are offset from each other, as shown in the drawings.

At the upper end of the lower portion 32 adjacent the upper portion 33 are a set of wedge grooves 40 which intersect both the linear grooves 36 and the linear grooves 37. Also, in the upper portion 33, there is an additional set of wedge grooves 41 which intersect both the linear grooves 37 and the linear grooves 36.

A pin 43 extends through the shaft 16 and is formed to be movable in any of the linear or wedge grooves. In the position shown in FIGS. 3 and 4, pin 43 engages the linear grooves 36 to index turntable 11 and to prevent rotation of shaft 16 and turntable 11.

Referring to FIGS. 3 to 6, with turntable 11 in the lower position, pin 43 engages one or more linear grooves 36 in the lower portion 32 of the guide tube 31. As shaft 16 is raised, pin 43 slides along linear groove 36 until pin 43 comes to the upper end of linear groove 36. Further movement of the shaft 16 upward will cause pin 43 to engage the wedge groove 41 in the upper portion 33. Since shaft 16 is free to rotate, the movement of pin 43 along wedge groove 41 will cause shaft 16 to rotate so as to move pin 43 into the linear groove 37 of the upper portion 33. The rotation of shaft 16 will cause turntable 11 to rotate through a portion of the desired angle of rotation. As shaft 16 is lowered, pin 43 moves along the linear groove 37 to engage wedge groove 40 in the lower portion 32. Continued lowering of shaft 16 causes the wedge groove 40 to move pin 43 to rotate shaft 16 and turntable 11. This rotation continues until the pin reaches a new linear groove 36 which will index pin 43, shaft 16 and turntable 11 in a new desired position. After this rotation, shaft 16 and turntable 11 are lowered to their final desired position without further rotation of turntable 11.

While the invention has been illustrated with a turntable having four stations 90° apart, thereby requiring four sets of guide grooves in both the upper and lower portions of the guide tube 13, it can be seen that the system could include any number of stations desired. In addition, the indexing points for the turntable 11 need not be equally spaced but can be unevenly spaced by forming the linear grooves in an unsymmetrical manner about the interior of guide tube 31.

The embodiments of the invention in which an exclusive property or privilege is claimed are defined as follows:

I claim:

1. A mechanism for rotating a glove box turntable through a predetermined angle, including in combination, a guide tube having first and second interior portions positioned along a common longitudinal axis, a shaft connected to the glove box turntable and inserted within said guide tube through said first and second interior portions, said first and second interior portions including first and second linear guide means respectively extending along said first and second interior portions substantially parallel to said longitudinal axis with said first linear guide means being offset from said second linear guide means, first wedge guide means positioned within said first interior portion and intersecting with said first and second linear guide means, second wedge guide means positioned within said second interior portion and intersecting with said second and first linear guide means, shaft rotating means coupled to said shaft and engageable with said first and second linear guide means and said first and second wedge guide means, means for moving said shaft along said longitudinal axis to move said shaft rotating means from said first interior portion to said second interior portion and back to said first interior portion, said shaft rotating means movement from said first to said second interior portion causing said shaft rotating means to move along said first linear guide means to engage said second wedge guide means and move long the same, said shaft rotating means movement along said second wedge guide means acting to rotate said shaft through a portion of the predetermined angle to position said shaft rotating means in said second linear guide means, said shaft movement from said second interior portion to said first interior portion causing said shaft rotating means to move along said second linear guide means to engage said first wedge guide means and move along the same, said shaft rotating means movement along said first wedge guide means acting to rotate said shaft through the remainder of the predetermined angle to position said shaft rotating means in said first linear guide means.

2. The glove box turntable rotating mechanism of claim 1 wherein, said first and second linear guide means and said first and second wedge guide means consist of grooves formed on said first and second interior portions of said guide tube, and said shaft rotating means includes a pin mechanically connected to said shaft and inserted in at least one of said grooves.

3. The glove box turntable rotating mechanism of claim 2 wherein, the glove box includes a plurality of stations, said guide tube including a plurality of each of said first and second linear guide means and said first and second wedge guide means equal to said plurality of said stations, said linear guide means and said wedge guide means being spaced around said first and second interior portions of said guide tube so that each of said plurality of stations can be positioned at a desired location in the glove box.

4. The glove box turntable rotating mechanism of claim 3 wherein, said turntable includes four stations spaced 90° apart, said guide tube including four each of said first and second linear guide means and said first and second wedge guide means positioned 90° apart around said first and second interior portions of said guide tube.